United States Patent
Shikoda et al.

(10) Patent No.: US 10,140,767 B2
(45) Date of Patent: Nov. 27, 2018

(54) WORKPIECE MACHINING WORK SUPPORT SYSTEM AND WORKPIECE MACHINING METHOD

(71) Applicant: KAWASAKI JUKOGYO KABUSHIKI KAISHA, Kobe-shi, Hyogo (JP)

(72) Inventors: Shigekazu Shikoda, Akashi (JP); Naohiro Nakamura, Akashi (JP); Shinichi Nakano, Suita (JP); Masahiko Akamatsu, Himeji (JP); Shingo Yonemoto, Kakogawa (JP); Daisuke Tokai, Akashi (JP); Takashi Koumoto, Kakogawa (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 0 days.

(21) Appl. No.: 14/787,108

(22) PCT Filed: Apr. 23, 2014

(86) PCT No.: PCT/JP2014/061404
§ 371 (c)(1),
(2) Date: Oct. 26, 2015

(87) PCT Pub. No.: WO2014/175324
PCT Pub. Date: Oct. 30, 2014

(65) Prior Publication Data
US 2016/0078681 A1    Mar. 17, 2016

(30) Foreign Application Priority Data
Apr. 24, 2013 (JP) ................................. 2013-091347

(51) Int. Cl.
*G06T 15/00* (2011.01)
*G06T 19/00* (2011.01)
(Continued)

(52) U.S. Cl.
CPC ............ *G06T 19/006* (2013.01); *G06T 7/001* (2013.01); *G06T 7/73* (2017.01); *H04N 7/18* (2013.01);
(Continued)

(58) Field of Classification Search
None
See application file for complete search history.

(56) References Cited

U.S. PATENT DOCUMENTS 6,879,874 B2 * 4/2005 Sinn ................... G05B 19/4097
700/181
9,221,117 B2 * 12/2015 Conrardy ............... B23K 37/04
(Continued)

FOREIGN PATENT DOCUMENTS

JP   H11-136706 A   5/1999
JP   2000-155855 A  6/2000
(Continued)

OTHER PUBLICATIONS

Suzuki, H., "3 Jigen CAD System no Saishin Doko," Nikkei computer graphics, May 1, 1992, pp. 140-148, No. 68.
(Continued)

*Primary Examiner* — Andrew G Yang
(74) *Attorney, Agent, or Firm* — Oliff PLC

(57) ABSTRACT

The system includes imaging unit configured to image a work space at a viewpoint position in a visual line direction of a worker together with a workpiece, a position attitude information obtaining unit configured to obtain a position attitude information which indicates a relative position attitude relation between a viewpoint of the worker and the workpiece in the work space, a virtual image generating unit configured to generate a three-dimensional virtual image which indicates a completed shape of the workpiece in the viewpoint position and the visual line direction of the
(Continued)

worker based on the position attitude information, an image composing unit configured to generate a composite image by superimposing the virtual image on a real image of the work space, and a display unit configured to display the composite image. According to the system, efficiency of workpiece machining work can be considerably improved by using the mixed reality technology.

14 Claims, 8 Drawing Sheets

(51) Int. Cl.
    *G06T 7/00*     (2017.01)
    *H04N 7/18*     (2006.01)
    *G06T 7/73*     (2017.01)

(52) U.S. Cl.
    CPC .............. *G06T 2207/30164* (2013.01); *G06T 2207/30204* (2013.01)

(56) References Cited

U.S. PATENT DOCUMENTS

| | | | |
|---|---|---|---|
| 2002/0084974 A1 | 7/2002 | Ohshima et al. | |
| 2002/0122581 A1* | 9/2002 | Erickson | H05K 13/0053 382/141 |
| 2002/0133264 A1* | 9/2002 | Maiteh | G05B 19/4097 700/182 |
| 2003/0090483 A1* | 5/2003 | Watanabe | B25J 9/1671 345/419 |
| 2004/0021664 A1 | 2/2004 | Takemoto et al. | |
| 2005/0174361 A1 | 8/2005 | Kobayashi et al. | |
| 2008/0150965 A1* | 6/2008 | Bischoff | G02B 27/01 345/632 |
| 2009/0265030 A1 | 10/2009 | Huang et al. | |
| 2013/0095924 A1 | 4/2013 | Geisner et al. | |
| 2013/0276280 A1* | 10/2013 | Wielens | B23Q 17/22 29/407.04 |
| 2014/0247280 A1* | 9/2014 | Nicholas | G06F 3/011 345/633 |
| 2014/0263224 A1* | 9/2014 | Becker | B23K 9/0956 219/124.5 |

FOREIGN PATENT DOCUMENTS

| | | |
|---|---|---|
| JP | 2002-006919 A | 1/2002 |
| JP | 2003-303356 A | 10/2003 |
| JP | 2005-107968 A | 4/2005 |
| JP | 2005-227876 A | 8/2005 |
| JP | 2005-293141 A | 10/2005 |
| JP | 2008-293209 A | 12/2008 |
| JP | 2009-069954 A | 4/2009 |
| JP | 2009-266221 A | 11/2009 |
| JP | 2012-113418 A | 6/2012 |

OTHER PUBLICATIONS

Jul. 15, 2014 International Search Report issued in International Patent Application No. PCT/JP2014/061404.

Oct. 27, 2015 International Preliminary Report on Patentability issued in International Patent Application No. PCT/JP2014/061404.

Mar. 15, 2018 Office Action issued in Japanese Patent Application No. 2015-513794.

Shuhei Yoshida et al. "Development of an Evaluation System for Free Curved Plate Thickness With a Robot-Presentations Using Augmented Reality—", 2009 Seimitsu Kogakai Shuki Taikai Gakujutu Koenkai Koen Ronbunshu, pp. 189-190, Feb. 25, 2010.

* cited by examiner

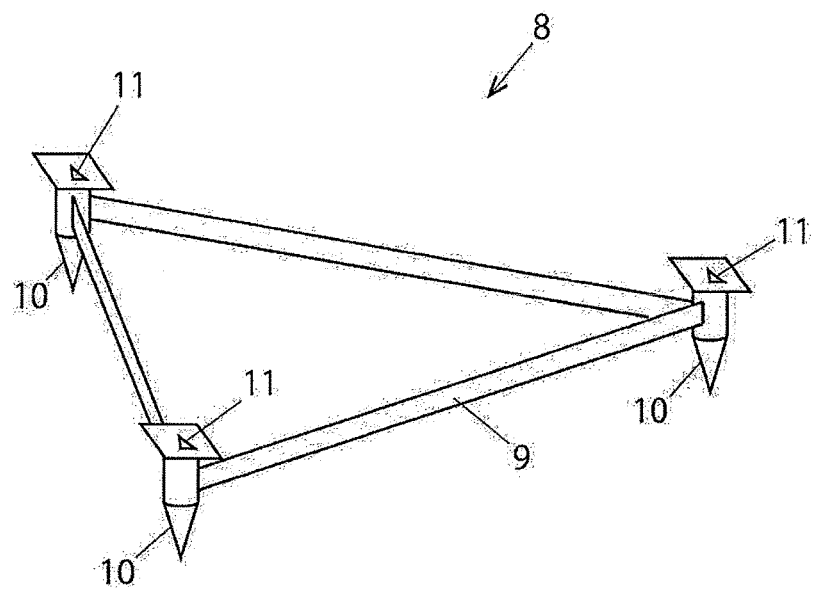
FIG. 3
FIG. 4
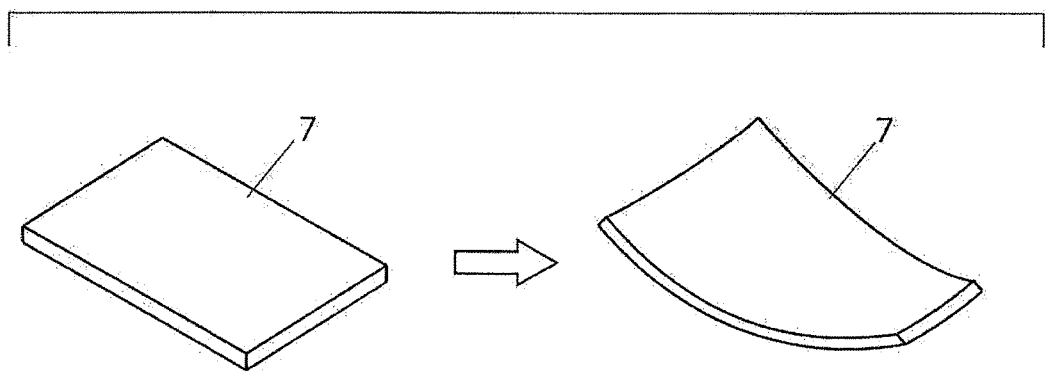

WORKPIECE MACHINING WORK SUPPORT SYSTEM AND WORKPIECE MACHINING METHOD

TECHNICAL FIELD

The present invention relates to a workpiece machining work support system for supporting workpiece machining work using a mixed reality technology and a workpiece machining method using the system.

BACKGROUND ART

Conventionally, when a plate-shaped workpiece is formed into a desired curved shape by press-forming in order to manufacture a large-sized structure such as a LNG tank, for example, a workpiece formed with a press machine is taken out from the press machine and a wooden gauge, which has been prepared in advance, is fitted to the workpiece so as to examine its shape.

Then, when it is judged that the workpiece needs to be further forming-machined as a result of the shape examination by the wooden gauge, the workpiece is returned to the press machine so as to press the same further.

As mentioned above, in the conventional press-forming, it is necessary to prepare the wooden gauge in advance in order to examine the shape of the workpiece after forming. Particularly, when the workpiece needs to be formed in a complicated shape such as the LNG tank, the shape examination cannot be performed with one kind of wooden gauge and a plurality of kinds of wooden gauges need to be prepared in advance.

Also, when the workpiece is taken out once from the press machine so as to fit the wooden gauge thereto for examining the shape of the workpiece by the wooden gauge, there is a problem that work time is prolonged and work efficiency is deteriorated.

Moreover, there is also a problem that judgment of acceptance is difficult because the shape examination needs to be performed by fitting a curved surface of the wooden gauge to a curved surface of the workpiece.

Further, when the workpiece is large, it is not always easy to fit the wooden gauge to the workpiece in the first place.

Also, when a local deformation of the workpiece is caught in fitting the wooden gauge thereto, sometimes it is erroneously determined to be failure even though it is within the allowable range.

Note that, recently, the mixed reality (MR) technology that an image of a virtual space is superposed on an image of a real space at an optional viewpoint and a composite image obtained in this manner is presented to an observer is attracting attention as an image technology for seamlessly integrating the real world with the virtual world seamlessly in real time (Patent Documents 1-4).

RELATED ART DOCUMENTS

Patent Documents

[Patent Document 1] Japanese Patent Application Laid-Open No. 2003-303356
[Patent Document 2] Japanese Patent Application Laid-Open No. 2005-107968
[Patent Document 3] Japanese Patent Application Laid-Open No. 2005-293141
[Patent Document 4] Japanese Patent Application Laid-Open No. 2008-293209

SUMMARY OF INVENTION

Problems to be Solved by the Invention

Then, an object of the present invention is to provide a workpiece machining work support system capable of solving the above-mentioned problems in workpiece machining work by using a mixed reality technology so as to considerably improve work efficiency, and a workpiece machining method using the system.

Means for Solving the Problems

In order to achieve the objects above, the present invention is a workpiece machining work support system for supporting a workpiece machining work, including: an imaging unit configured to image a work space at a viewpoint position in a visual line direction of a worker together with the workpiece; a position attitude information obtaining unit configured to obtain a position attitude information which indicates a relative position attitude relation between a viewpoint of the worker and the workpiece in the work space; a virtual image generating unit configured to generate a three-dimensional virtual image which indicates a completed shape of the workpiece in the viewpoint position and the visual line direction based on the position attitude information; an image composing unit configured to generate a composite image by superimposing the virtual image on a real image of the work space imaged by the imaging unit; and a display unit configured to display the composite image.

Also, it is preferable that the position attitude information obtaining unit has a marker for mixed reality installed temporarily in a predetermined relative position with respect to a reference point on the workpiece.

Also, it is preferable that the position attitude information obtaining unit has a marker for mixed reality installed in a location that a relative position with respect to a reference point on the workpiece does not substantially change according to the machining work.

Also, it is preferable that the marker for mixed reality is installed on a holding member which holds the workpiece during machining.

Also, it is preferable that the position attitude information obtaining unit has a position direction measuring device configured to measure the viewpoint position and the visual line direction of the worker and a position of the workpiece.

Also, it is preferable that the virtual image indicating the completed shape is generated including an allowable machining error in the machining work.

Also, it is preferable that the workpiece machining work support system further includes an error determination unit configured to display a discrepancy position between the real image of the workpiece and the virtual image which indicates the completed shape in the display portion.

Also, it is preferable that the workpiece machining work support system further includes a virtual image position adjusting unit configured to move the virtual image to the real image so as to minimize a discrepancy rate between the real image of the workpiece and the virtual image which indicates the completed shape.

Also, it is preferable that the machining work includes a press-forming work to the workpiece.

In order to achieve the objects above, the present invention is a workpiece machining method using a workpiece machining work support system for supporting a workpiece machining work, including: a machining step which machines the workpiece by a machining device; an imaging step which images a work space at a viewpoint position in a visual line direction of a worker together with the workpiece during the machining step; a position attitude information obtaining step which obtains a position attitude information which indicates a relative position attitude relation between a viewpoint of the worker and the workpiece in the work space; a virtual image generating step which generates a three-dimensional virtual image which indicates a completed shape of the workpiece in the viewpoint position and visual line direction based on the position attitude information; an image composing step which generates a composite image by superimposing the virtual image on a real image of the work space imaged by the imaging unit; and a display step which displays the composite image.

Also, it is preferable that the position attitude information obtaining step includes a marker installation step which installs a marker for mixed reality temporarily in a predetermined relative position with respect to a reference point on the workpiece.

Also, it is preferable that, in a state that a machining of the workpiece has progressed and the workpiece has been machined to some extent in the machining step, the marker for mixed reality is temporarily installed in a predetermined position of the workpiece during processing in the marker installing step, a place where the real image of the workpiece is displayed with respect to the three-dimensional virtual image indicating the completed image of the workpiece, if any, being determined to be corrected based on the composite image displayed in the display step.

Also, it is preferable that a plurality of markers for mixed reality are stuck on a surface of the workpiece.

Also, it is preferable that the machining device is a press machine, and the machining step includes a press-forming work to the workpiece.

Advantageous Effect of the Invention

By the workpiece machining work support system according to the present invention and the workpiece machining work using the system, a shape examination by a conventional wooden gauge becomes unnecessary by using the mixed reality technology, and therefore work efficiency of workpiece machining can be considerably improved.

BRIEF DESCRIPTION OF THE DRAWINGS

FIG. 3 is a perspective enlarged view illustrating a marker member of the workpiece machining work support system in FIG. 1.

FIG. 4 is a schematic view illustrating how an object to be supported by the workpiece machining work support system in FIG. 1 is pressed as an example.

EMBODIMENT OF THE INVENTION

Figure 1:
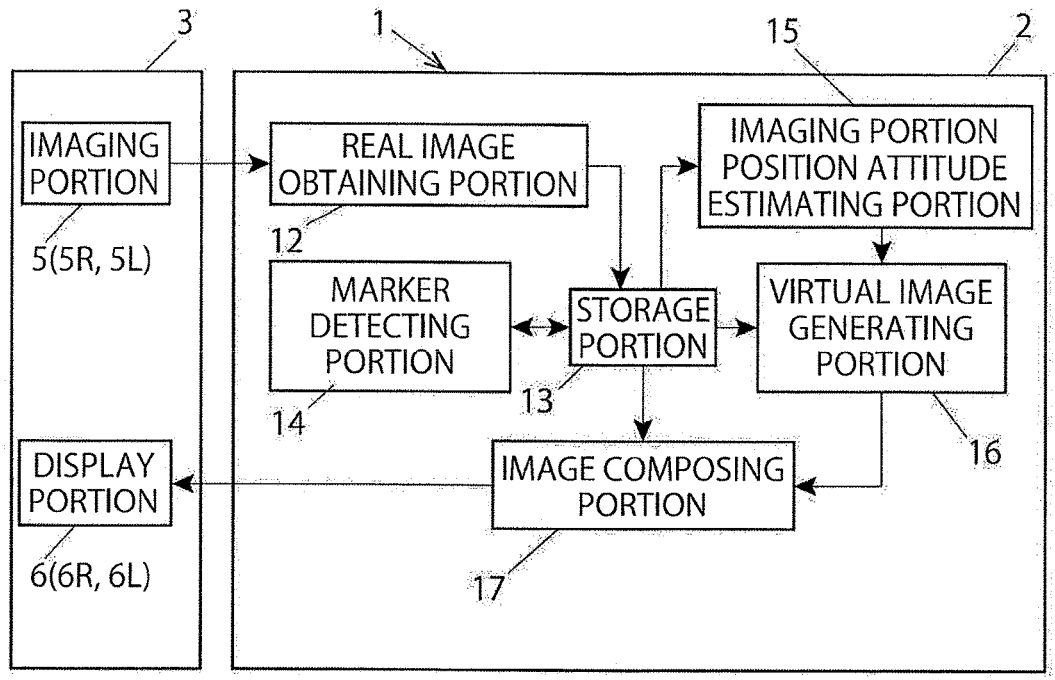
FIG. 1 is a block diagram illustrating a schematic configuration of a workpiece machining work support system according to an embodiment of the present invention.

Hereunder, the workpiece machining work support system according to an embodiment of the present invention will be described. Note that, although a workpiece machining work to be supported by the system is typically a press-forming work, other than the press-forming work, the system can support various machining works that a workpiece shape changes according to machining.

As the workpiece machining work support system according to the embodiment uses the mixed reality technology, the mixed reality technology will be briefly explained first.

As previously mentioned, the mixed reality technology is a video technology which superimposes an image of a virtual space on an image of a real space at an arbitrary viewpoint and indicates a composite image obtained by this to an observer, integrating the real world with the virtual world seamlessly in real time.

Namely, the mixed reality technology provides an observer with a composite image obtained by composing a real space image and a virtual space image generated according to a viewpoint position and a visual line direction of the observer. And, it can have the observer perceive the scale of a virtual object by the sense of actual dimension so as to have the observer feel that the virtual object actually exists in the real world.

The mixed reality technology enables the observer to see computer graphics (CG) from an optional position or angle by actually moving, not by operating the same with a mouse or a keyboard. Namely, it is possible that CG is placed in a designated place by an image positioning technology and the CG is seen from various angles using a see-through type head mount display (HMD), for example.

In order to express a mixed reality space (MR space), it is necessary to obtain a relative position attitude relation between a coordinates system in the real space to be a reference determining the position attitude of a virtual object to be superimposed in the real space and a coordinate system of an imaging portion (camera coordinate system)

For example, what utilizes a magnetic sensor, an optical sensor, or an ultrasonic sensor, or what utilizes a marker, a gyro, or the like can be given as an appropriate image positioning technology therefore.

Here, the marker (also called "land mark") is an index used for positioning an image. The position attitude of a camera can be estimated by image processing by imaging the marker arranged in the real space with a camera (imaging device) mounted on HMD.

Namely, the marker having a predetermined visual feature is placed in a known three-dimensional coordinates in the real space, and the marker included in the real image is detected, and the position attitude of the camera (imaging device) is calculated from a two-dimensional image position of a constitutional element (center or vertex of the marker) of the detected marker and the known three-dimensional coordinates.

The workpiece machining work support system of the embodiment utilizes the above-mentioned mixed reality technology, and hereunder, the configuration thereof will be described with reference to FIGS. 1 and 2.

Figure 2:
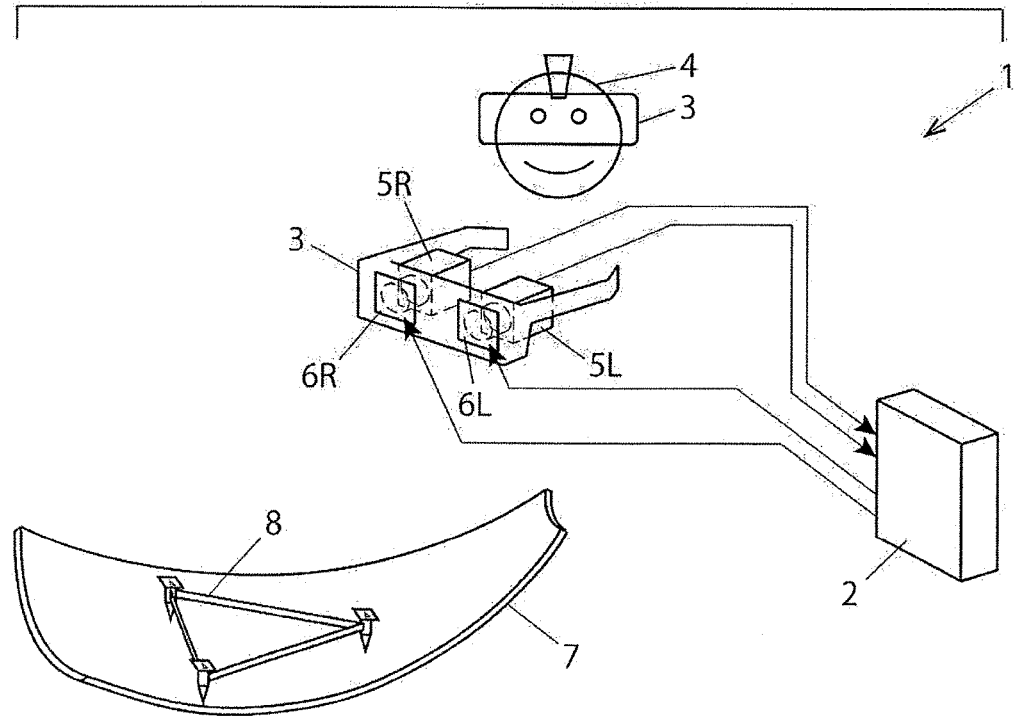
FIG. 2 is a schematic view illustrating the schematic configuration of the workpiece machining work support system in FIG. 1.

As illustrated in FIGS. 1 and 2, a workpiece machining work support system 1 according to the embodiment has a system body 2 and a head mount display (HMD) 3 which performs data communication with the system body 2, and a marker member 8.

The system body 2 of the workpiece machining work support system 1 is configured by a computer having CPU, RAM, ROM, an external storage device, a storage medium drive device, a display device, an input device, or the like.

As illustrated in FIG. 2, a HMD 3 having an imaging portion 5 and a display portion 6 is mounted on the head of a worker 4. Two pairs of the imaging portion 5 and the display portion 6 are provided. The imaging portion 5R and the display portion 6R are for the right eye, and the imaging portion 5L and the display portion 6L are for the left eye. By the configuration, a parallax image can be presented to the right eye and the left eye of the worker 4 who mounts the HMD 3 on his/her head, and a MR image (composite image) can be displayed three-dimensionally.

The imaging portion 5 of the HMD 3 images a workpiece 7 installed on a press machine (machining device) together with a marker member 8 for MR installed on the workpiece 7 (imaging step). The marker member 8 is to be installed in a predetermined relative position with respect to a reference point on the workpiece 7 and installed temporarily on the workpiece 7 during a press work (marker installation step).

As illustrated in FIG. 3, the marker member 8 according to the embodiment has a triangle frame portion 9, each supporting portion 10 provided on the lower surface of each vertex of the triangle frame portion 9, and each marker for mixed reality 9 provided on the upper surface of each vertex of the triangle frame portion 9.

As illustrated in FIG. 1, a real image in the real space obtained by the imaging portion 5 of the HMD 3 is input to a real image obtaining portion 12 of the system body 2. The real image obtaining portion 12 outputs data of the input real image to a storage portion 13 of the system body 2.

The storage portion 13 holds necessary information for a presentation processing of a MR image (composite image) and reads out and updates the information according to a process.

Also, the system body 2 has a marker detecting portion 14 for detecting the marker 11 provided in the marker member 8 from the real image held by the storage portion 13.

Next, a detection result of the marker 11 of the marker member 8 arranged on the workpiece 7 as a real object is sent to an imaging portion position attitude estimating portion 15 from the marker detecting portion 14 via the storage portion 13. The imaging portion position attitude estimating portion 15 estimates a position attitude of the imaging portion 5 of the HMD 3 in the object coordinate system of the workpiece 7 itself as the reference coordinate system.

Here, the marker member 8, the marker detecting portion 14, and the imaging portion position attitude estimating portion 15 configure the position attitude information obtaining unit in the workpiece machining work support system 1.

The position attitude of the imaging portion 5 of the HMD 3 estimated by the imaging portion position attitude estimating portion 15 is sent to a virtual image generating portion 16. The virtual image generating portion 16 generates a three-dimensional virtual image of a virtual object seen from the position attitude of the imaging portion 5 based on the position attitude of the imaging portion 5 sent from the imaging portion position attitude estimating portion 15, namely the viewpoint position and the visual line direction of the worker 4 (virtual image generating step).

Here, in the workpiece machining work support system 1, a virtual image regarding a completed shape (target shape) after the workpiece 7 is machined by predetermined press working in the virtual image generating portion 16. The three-dimensional virtual image in the completed shape is displayed so as to be provided with thickness of the allowable machining error.

The virtual image regarding the completed shape of the workpiece 7 generated in the virtual image generating portion 16 is sent to an image composing portion 17 of the system body 2. The image composing portion 17 superimposes the virtual image sent from the virtual image generating portion 16 on the real image held by the storage portion 13 so as to generate the MR image (composite image) (image composing step).

The MR image (composite image) generated in the image composing portion 17 is output to the display portion 6 of the HMD 3 (display step). Thereby, the MR image that the image of the real space according to the position attitude of the imaging portion 5 of the HMD 3 and the image of the virtual space are superimposed mutually is displayed on the display portion 6 of the HMD3, enabling the worker 4 wearing the HMD 3 on his/her head to experience the mixed real space.

The workpiece machining work support system 1 according to the embodiment is suitable for support when machining the plate-shaped workpiece 7 into a predetermined curved surface shape by press working (machining step), as illustrated in FIG. 4.

Figure 5:
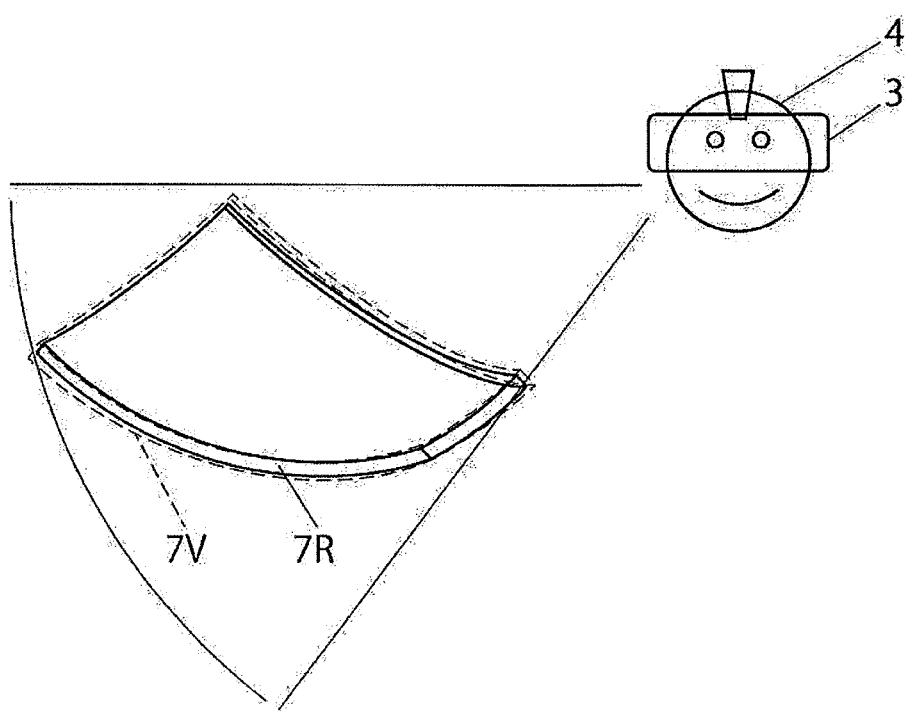
FIG. 5 is a schematic view illustrating a state that a worker checks how a workpiece is formed using the workpiece machining work support system in FIG. 1.

Namely, though the quality of press-forming is checked with the wooden gauge conventionally, by using the workpiece machining work support system 1 instead, the worker 4 can use the virtual image 7V in the completed shape (target shape) superimposed on the real image 7R of the workpiece 7 as the examination reference, as illustrated in FIG. 5.

The worker 4 suitably checks whether the real image 7R of the workpiece 7 during machining, which is displayed on the display portion 6 of the HMD 3, is included in the three-dimensional virtual image 7V in the completed shape which is similarly displayed on the display portion 6 of the HMD 3, or not.

Namely, at the stage that pressing work of the workpiece 7 progresses and the workpiece 7 is formed to some extent, the press machine is once stopped and the marker member 8 is arranged in a predetermined position of the workpiece 7 during machining so as to check the three-dimensional images 7R, 7V displayed on the display portion 6 of the HMD 3. Then, if there is a portion that the real image 7R of the workpiece 7 projects from the virtual image 7V in the completed shape, the portion is determined to be corrected.

Here, as the marker member 8 is extremely compact compared to the conventional wooden gauge, it is not necessary to take the trouble to move the workpiece 7 from the press machine by a crane or the like in order to install the marker member 8 on the workpiece 7.

When the whole real image 7R of the workpiece 7 is included in the virtual image 7V in the completed shape eventually, the worker 4 judges that the desired forming is completed.

Figure 6:
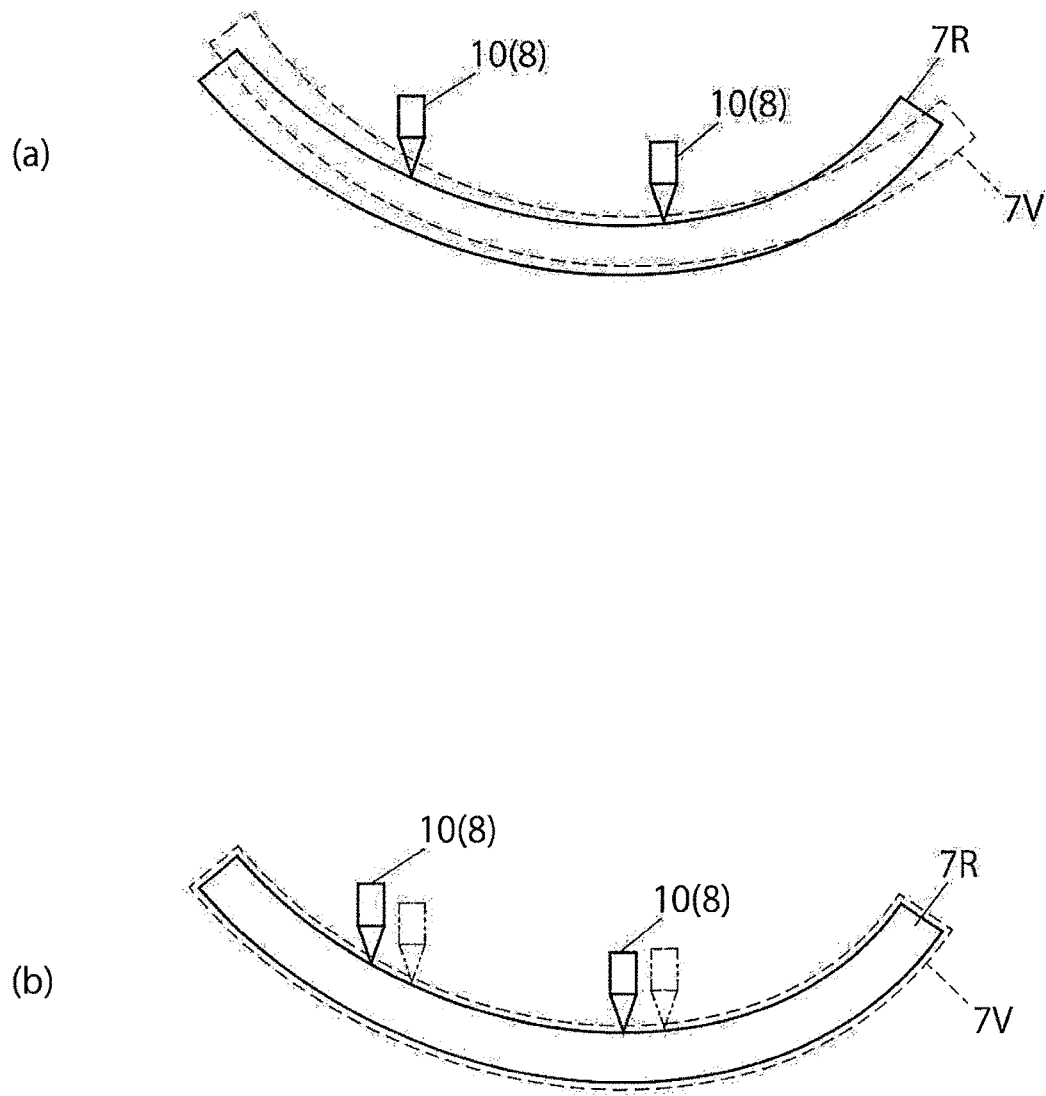
FIG. 6 illustrates how the workpiece machining work support system in FIG. 1 is used; (a) illustrates a state that a real image of workpiece protrudes from a virtual image in a completed shape, and (b) illustrates a state that the real image of workpiece is included in the virtual image in the completed shape.

Here, it is possible that part of the real image 7R of the workpiece 7 is projected from the virtual image 7V in the completed shape as illustrated in FIG. 6 (a) because the virtual image 7V in the completed shape is deviated with respect to the real image 7R of the workpiece 7 as a whole although the workpiece 7 is already formed into the desired completed shape.

Considering such a case, the worker 4 slightly moves the installation position of the marker member 8 on the workpiece 7 so as to try whether the virtual image 7A in the completed shape displayed on the display portion 6 of the HMD 3 can include the whole real image 7R of the workpiece 7.

And, when the virtual image 7V in the completed shape can include the whole real image 7R of the workpiece 7, the workpiece 7 is determined to have been formed into the desired completed shape.

As described above, by the workpiece machining work support system 1 according to the embodiment, how the workpiece 7 is formed can be confirmed by a pseudo visual inspection at site without using the wooden gauge and without necessity of moving the workpiece 7 during machining from the press machine unlike the conventional manner. Therefore, work efficiency of press working of the workpiece 7 can be considerably improved.

Also, as the shape of the workpiece 7 during machining can be checked from various angles via the HMD 3, an inspection error is not caused by catching local deformation unlike the conventional wooden gauge.

Next, a modified example of the above-stated embodiment will be described referring to FIG. 7.

In the above-stated embodiment, as illustrated in FIG. 2, the marker member 8 as the position attitude information obtaining unit is temporarily installed in a predetermined position on the workpiece 7.

In contrast, in the modified example, the marker for mixed reality as the position attitude information obtaining unit is installed in a place that the relative position with respect to the reference point on the workpiece 7 does not substantially change according to machining work.

Figure 7:
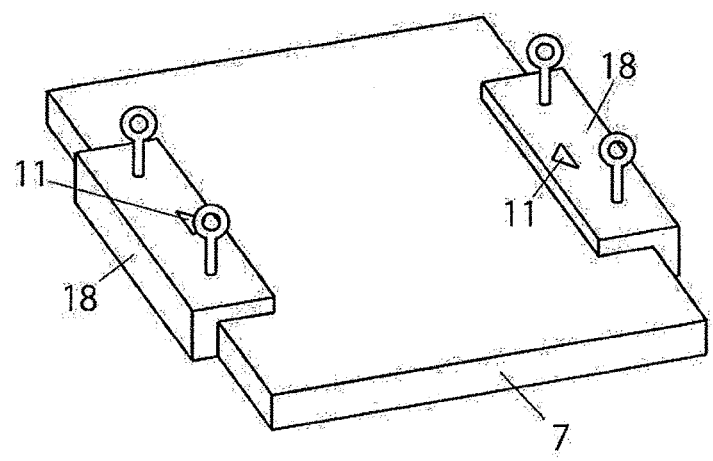
FIG. 7 is a schematic view illustrating a modified example of the workpiece machining work support system in FIG. 1.

Specifically, as illustrated in FIG. 7, a holding member 18, which is hung by a crane or the like, is mounted on an unused portion of the workpiece 7, and the marker for mixed reality 11 is installed to the holding member 18.

Also in the modified example, the position attitude information which indicates the relative position attitude relation between the viewpoint of the worker 4 and the workpiece 7 in the work space can be obtained by imaging the workpiece 7 together with the marker for mixed reality 11 by the imaging portion 5 of the HMD 3.

Next, another modified example of the above-stated embodiment will be described referring to FIG. 8.

Figure 8:
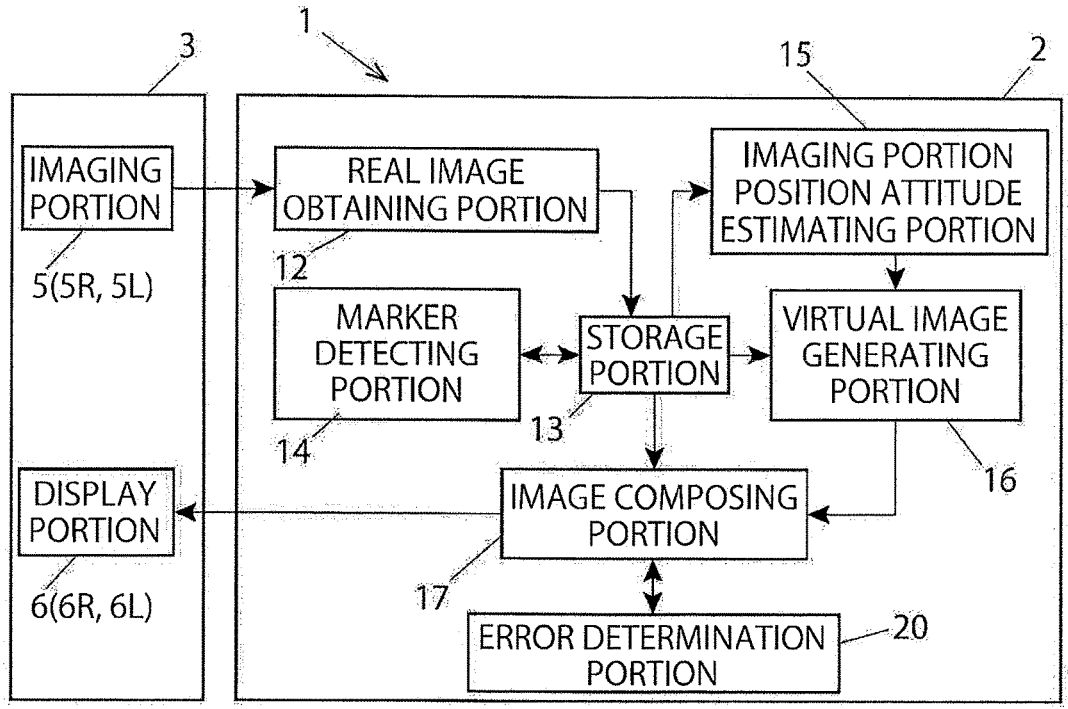
FIG. 8 is a block diagram illustrating another modified example of the workpiece machining work support system in FIG. 1.

The workpiece machining work support system according to the modified example further comprises an error determination portion 20 for detecting a discrepancy position between the real image 7R of the workpiece 7 and the virtual image 7V in the completed shape by a pattern matching so as to display the same together with information indicating the degree of the discrepancy on the display portion 6 of the HMD 3, as illustrated in FIG. 8.

Specifically, on the display portion 6 of the HMD 3, the discrepancy portion between the real image 7R of the workpiece 7 and the virtual image 7V in the completed shape is displayed, classified with colors distinguishing a positive tolerance and a negative tolerance. Thereby, the worker 4 can easily recognize the deviation of the workpiece shape from the target shape.

Figure 9:
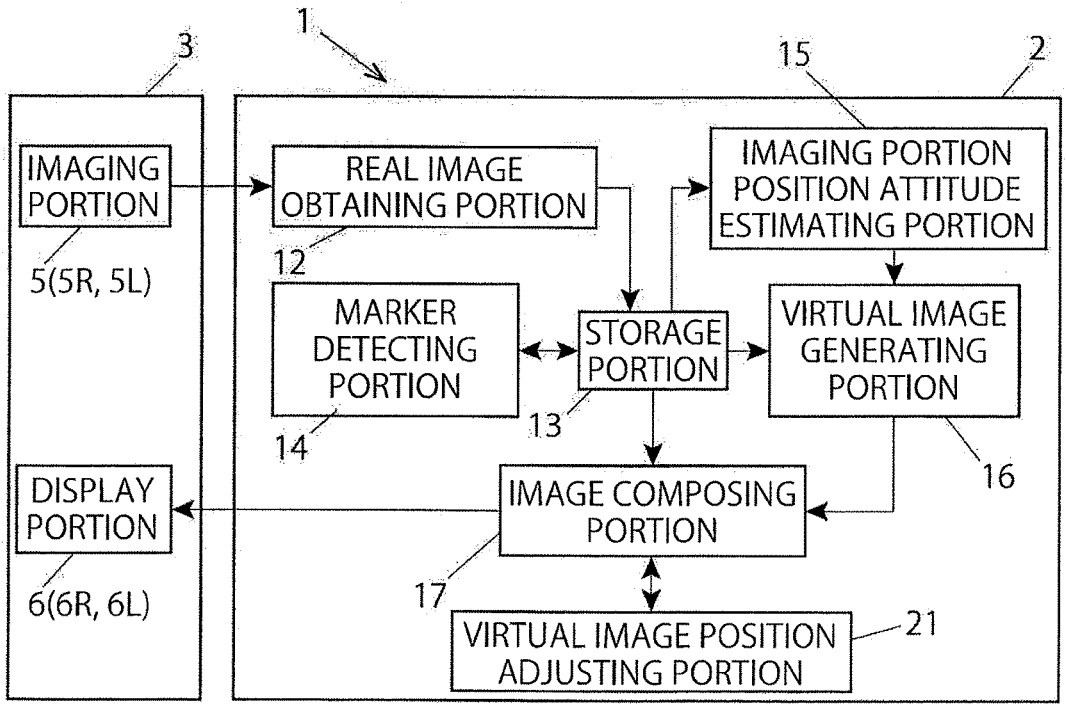
FIG. 9 is a block diagram illustrating a schematic configuration of further another modified example of the workpiece machining work support system in FIG. 1.

Next, another modified example of the above-stated embodiment will be described referring to FIG. 9.

The workpiece machining work support system according to the modified example comprises a virtual image position adjusting unit configured to move the virtual image 7V with respect to the real image 7R so as to minimize a discrepancy rate between the real image 7R of the workpiece 7 and the virtual image 7V in the completed shape.

Specifically, the virtual image position adjusting portion 21 adjusts the position of the virtual image 7V with respect to the real image 7R so that a coincidence rate between the real image 7R of the workpiece 7 and the virtual image 7V in the completed shape is maximized by pattern matching.

Note that, when performing pattern matching, a place to be regarded as important and a place to be regarded as less important can be weighted for press working. For example, a place whose deformation affects greatly to another place such as the center portion of a workpiece is regarded as important, and a place whose deformation affects less to another place such as the peripheral edge portion of the workpiece is regarded as less important.

The worker 4 can accurately recognize the deviation between the workpiece shape and the completed shape by checking the superposed image of the virtual image 7V after being adjusted by the virtual image position adjusting portion 21 and the real image 7R of the workpiece 7.

Next, another modified example of the above-stated embodiment will be described referring to FIG. 11.

Figure 11:
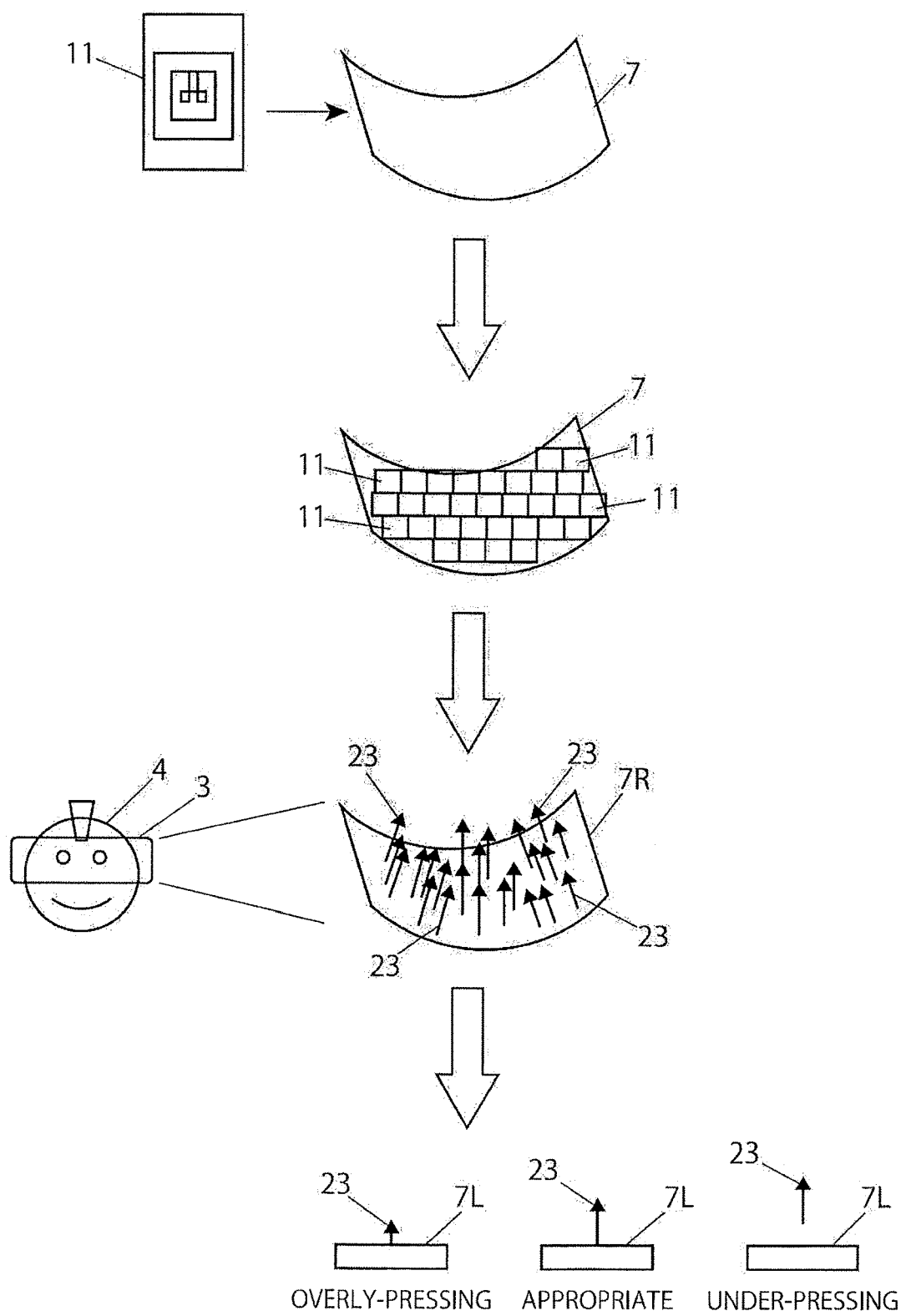
FIG. 11 is a schematic view illustrating a schematic configuration of further another modified example of the workpiece machining work support system in FIG. 1.

As illustrated in FIG. 11, in the modified example, the markers 11 are stuck on the whole surface of the workpiece 7. A normal vector 23 of each of the markers 11 at the center thereof can be recognized. Therefore, the worker 4 can recognize a plurality of normal vectors extending from the surface of the real image 7R of the workpiece 7 by making the HMD 3 display the workpiece 7 whose whole surface are stuck with the markers 11.

When a virtual image (CAD data) 7L of the workpiece 7 in the completed shape is superimposed on the real image 7R of the workpiece displayed in the HMD 3, the state that the normal vector 23 extending from the surface of the real image 7R of the workpiece 7 is embedded into the virtual image 7L of the workpiece 7 changes according to the press degree of the workpiece 7.

Namely, when the press degree is too large (the state of overly-pressing), (part of) the normal vector 23 is embedded into the virtual image 7L of the workpiece 7. On the contrary, when the press degree is too small (the state of under-pressing), the normal vector 23 is apart from the surface of the virtual image 7L.

In contrast, when the press degree is appropriate, the normal vector 23 is not embedded into the virtual image 7L of the workpiece 7 and is not apart from the surface of the virtual image 7L, and the base end portion of the normal vector 23 is positioned just on the surface of the virtual image 7L of the workpiece 7L.

Therefore, the worker 4 can intuitively grasp a portion to be pressed and the displacement quantity to be pressed in the workpiece 7 by checking to what extent the normal vector 23 is embedded into the virtual image 7L of the workpiece 7 or to what extent the normal vector 23 is apart from the virtual image 7L.

Figure 10:
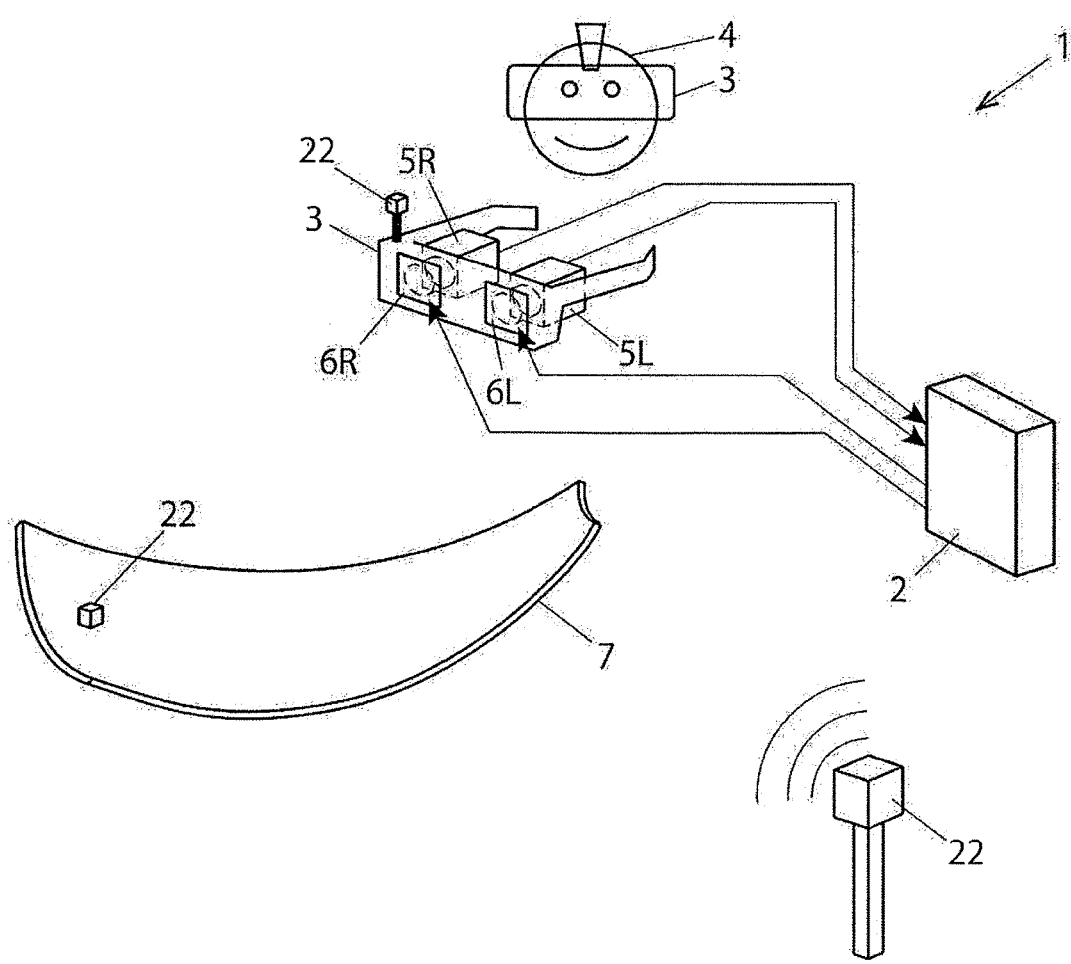
FIG. 10 is a schematic view illustrating a schematic configuration of further another modified example of the workpiece machining work support system in FIG. 1.

Note that, although the position attitude information obtaining unit in the workpiece machining work support system 1 is configured by the marker member 8, the marker detecting portion 14, and the imaging portion position attitude estimating portion 15 in the above-stated embodiment and its modified examples, a position direction measuring device 22 for measuring the viewpoint position and visual line direction of the worker 4 and the position of the workpiece 7 can be provided instead of or in addition to the same, as illustrated in FIG. 10. As the position direction measuring device 22 of this type, for example, an ultrasonic sensor, or a magnetic/optical position measuring sensor can be used.

Also, instead of the marker for mixed reality 11 to be separately prepared as stated above, part of the workpiece 7 itself (for example, a corner portion as a geometric characteristic point) can also be utilized as a reference point (a kind of marker) for positioning.

DESCRIPTION OF REFERENCE NUMERALS

1 . . . Workpiece machining work support system
2 . . . System body
3 . . . Head mount display (HMD)
4 . . . Worker
5, 5R, 5L . . . Imaging portion of HMD
6, 6R, 6L . . . Display portion of HMD
7 . . . Workpiece
7R . . . Real image of workpiece
7L . . . Virtual image of completed shape of workpiece
8 . . . Marker member
9 . . . Frame member of marker member
10 . . . Supporting portion of marker member
11 . . . Marker
12 . . . Real image obtaining portion
13 . . . Storage portion
14 . . . Marker detecting portion
15 . . . Imaging portion position attitude estimating portion
16 . . . Virtual image generating portion
17 . . . Image composing portion
18 . . . Holding member
20 . . . Error determination portion
21 . . . Virtual image position adjusting portion
22 . . . Position direction measuring device
23 . . . Normal vector of marker

The invention claimed is:

1. A workpiece machining work support system for supporting a workpiece machining work, comprising:
an imaging unit configured to image a work space at a viewpoint position in a visual line direction of a worker together with the workpiece;
a position attitude information obtaining unit configured to obtain a position attitude information which indicates a relative position attitude relation between a viewpoint of the worker and the workpiece in the work space;
a virtual image generating unit configured to generate a three-dimensional virtual image which indicates a target completed shape of the workpiece in the viewpoint position and the visual line direction based on the position attitude information;
an image composing unit configured to generate a composite image by superimposing the virtual image on a real image of the work space imaged by the imaging unit, wherein the real image indicates a real completed shape of the workpiece in the viewpoint position, and the composite image provides a comparison between the real completed shape and the target completed shape of the workpiece, with the target completed shape superimposed on the real completed shape; and
a display unit configured to display the composite image for the comparison between the real completed shape of the workpiece and the superimposed target completed shape of the workpiece, wherein
the machining work includes a press-forming work to the workpiece, and
the workpiece includes a curved surface, the display unit displays a plurality of vectors normal to a curved surface of the real completed shape of the workpiece, and a display state of the plurality of vectors relative to a curved surface of the target completed shape of the workpiece indicates a press degree of the workpiece.

2. The workpiece machining work support system according to claim 1, wherein
the position attitude information obtaining unit has a marker for mixed reality installed temporarily in a predetermined relative position with respect to a reference point on the workpiece.

3. The workpiece machining work support system according to claim 2, wherein
the virtual image generating unit generates the virtual image indicating the target completed shape based on a detection of the marker installed on the workpiece, for the comparison between the real completed shape of the workpiece and the superimposed target completed shape of the workpiece.

4. The workpiece assembly work support system according to claim 1, wherein
the position attitude information obtaining unit has a marker for mixed reality installed in a location that a relative position with respect to a reference point on the workpiece does not substantially change according to the machining work.

5. The workpiece machining work support system according to claim 4, wherein
the marker for mixed reality is installed on a holding member which holds the workpiece during machining.

6. The workpiece machining work support system according to claim 1, wherein
the position attitude information obtaining unit has a position direction measuring device configured to measure the viewpoint position and the visual line direction of the worker and a position of the workpiece.

7. The workpiece machining work support system according to claim 1, wherein
the virtual image indicating the target completed shape is generated including an allowable machining error in the machining work.

8. The workpiece machining work support system according to claim 1, further comprising:
an error determination unit configured to display in the display unit a discrepancy position between the real image which indicates the real completed shape of the workpiece and the virtual image which indicates the target completed shape.

9. The workpiece machining work support system according to claim 1, further comprising:
a virtual image position adjusting unit configured to move the virtual image to the real image so as to minimize a discrepancy rate between the real image of the workpiece and the virtual image which indicates the target completed shape.

10. A workpiece machining method using a workpiece machining work support system for supporting a workpiece machining work, comprising:
a machining step which machines the workpiece by a machining device;
an imaging step which images a work space at a viewpoint position in a visual line direction of a worker together with the workpiece during the machining step;
a position attitude information obtaining step which obtains a position attitude information which indicates a relative position attitude relation between a viewpoint of the worker and the workpiece in the work space;
a virtual image generating step which generates a three-dimensional virtual image which indicates a target completed shape of the workpiece in the viewpoint position and visual line direction based on the position attitude information;
an image composing step which generates a composite image by superimposing the virtual image on a real image of the work space imaged by the imaging step, wherein the real image indicates a real completed shape of the workpiece in the viewpoint position, and the composite image provides a comparison between the real completed shape and the target completed shape of the workpiece, with the target completed shape superimposed on the real completed shape; and
a display step which displays the composite image for the comparison between the real completed shape of the workpiece and the superimposed target completed shape of the workpiece, wherein
the machining device is a press machine,
the machining step includes a press-forming work to the workpiece, and
the workpiece includes a curved surface, the display step includes displaying a plurality of vectors normal to a curved surface of the real completed shape of the workpiece, and a display state of the plurality of vectors relative to a curved surface of the target completed shape of the workpiece indicates a press degree of the workpiece.

11. The workpiece machining method according to claim 10, wherein
the position attitude information obtaining step includes a marker installation step which installs a marker for mixed reality temporarily in a predetermined relative position with respect to a reference point on the workpiece.

12. The workpiece machining method according to claim 11, wherein,
in a state that a machining of the workpiece has progressed and the workpiece has been machined to some extent in the machining step, the marker for mixed reality is temporarily installed in a predetermined position of the workpiece during processing in the marker installing step, a place where the real image of the workpiece is displayed with respect to the three-dimensional virtual image indicating the completed image of the workpiece, if any, being determined to be corrected based on the composite image displayed in the display step.

13. The workpiece machining method according to claim 11, wherein
a plurality of markers for mixed reality are stuck on a surface of the workpiece.

14. The workpiece machining method according to claim 11, wherein
the virtual image generating step generates the virtual image indicating the target completed shape based on a detection of the marker installed on the workpiece, for the comparison between the real completed shape of the workpiece and the superimposed target completed shape of the workpiece.

* * * * *